June 16, 1931. W. C. KLEIN 1,810,834
ROLLER BEARING FREE WHEEL DRIVE
Filed Dec. 3, 1930 2 Sheets-Sheet 2

Inventor
W. C. Klein.
By
Attorney

Patented June 16, 1931

1,810,834

UNITED STATES PATENT OFFICE

WILLIAM C. KLEIN, OF ALLENTOWN, PENNSYLVANIA

ROLLER-BEARING FREE WHEEL DRIVE

Application filed December 3, 1930. Serial No. 499,820.

This invention relates to a drive for an anti-friction, roller-bearing free wheel construction such as that disclosed in Letters Patent No. 1,637,906 issued to me and in application for Letters Patent of the United States, Serial Number 390,558 for an improved anti-friction roller-bearing free wheel, filed September 5, 1929.

It is aimed to provide a novel drive to attain in a construction of the character mentioned, quicker acceleration, smoother riding qualities, less noise in operation, greater saving in power and in wear on the wheels and rails and to attain a low center of gravity to permit greater speed.

The above advantages I attain by employing a separate motor drive for each of the free wheels, that is two independent motors, for each axle, one for each wheel.

The more specific objects and advantages will become apparent from a consideration of the description following taken in connection with accompanying drawings illustrating an operative embodiment and wherein:—

Figure 1:
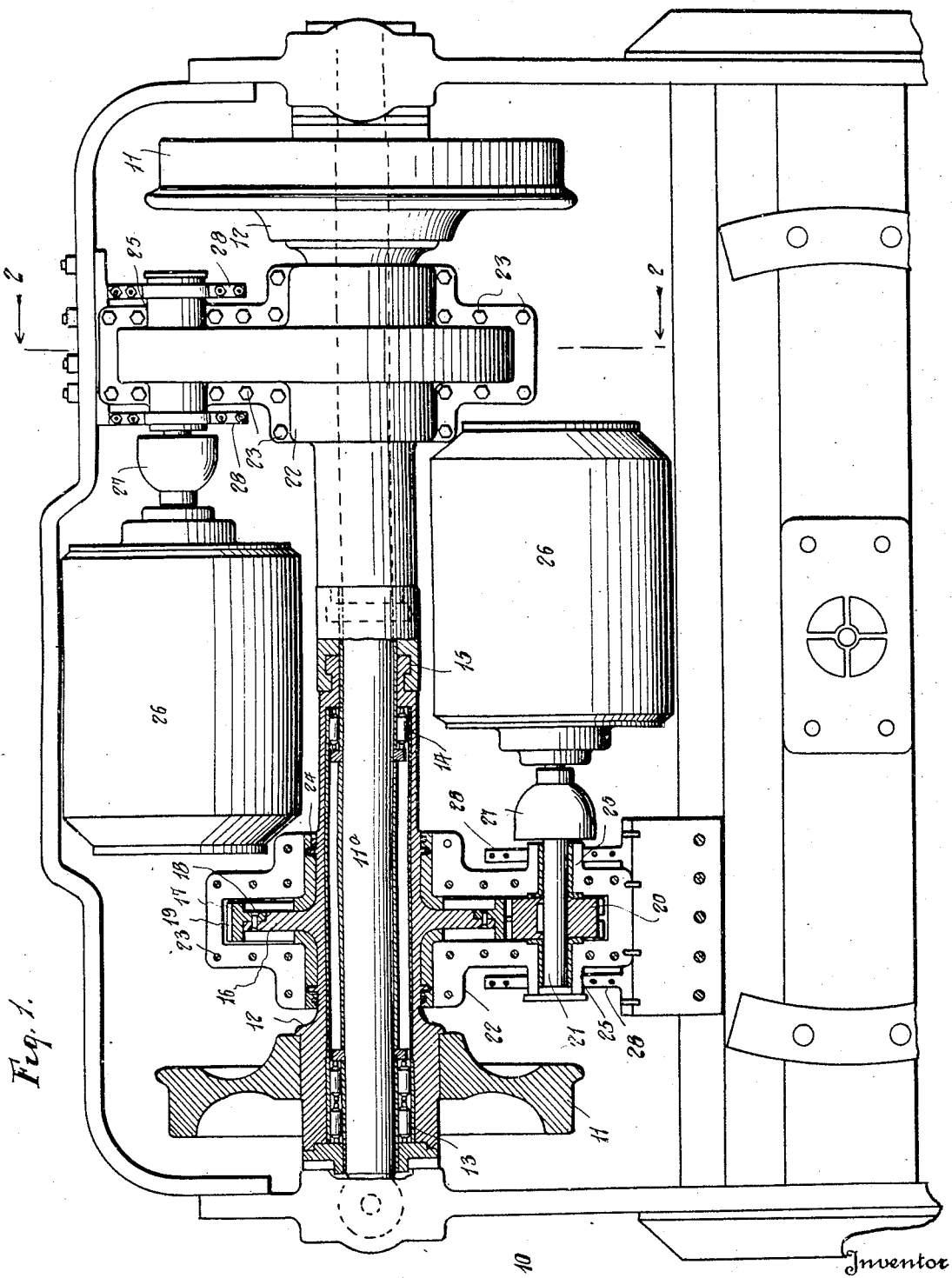
Figure 2:
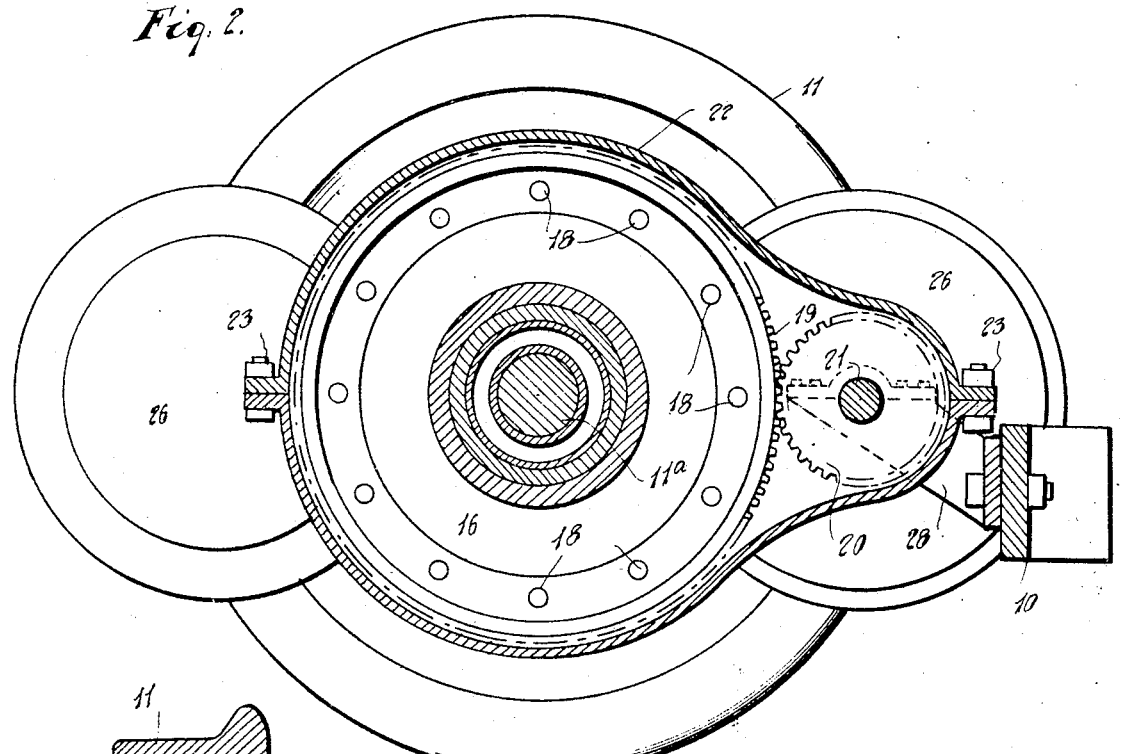
Figure 3:
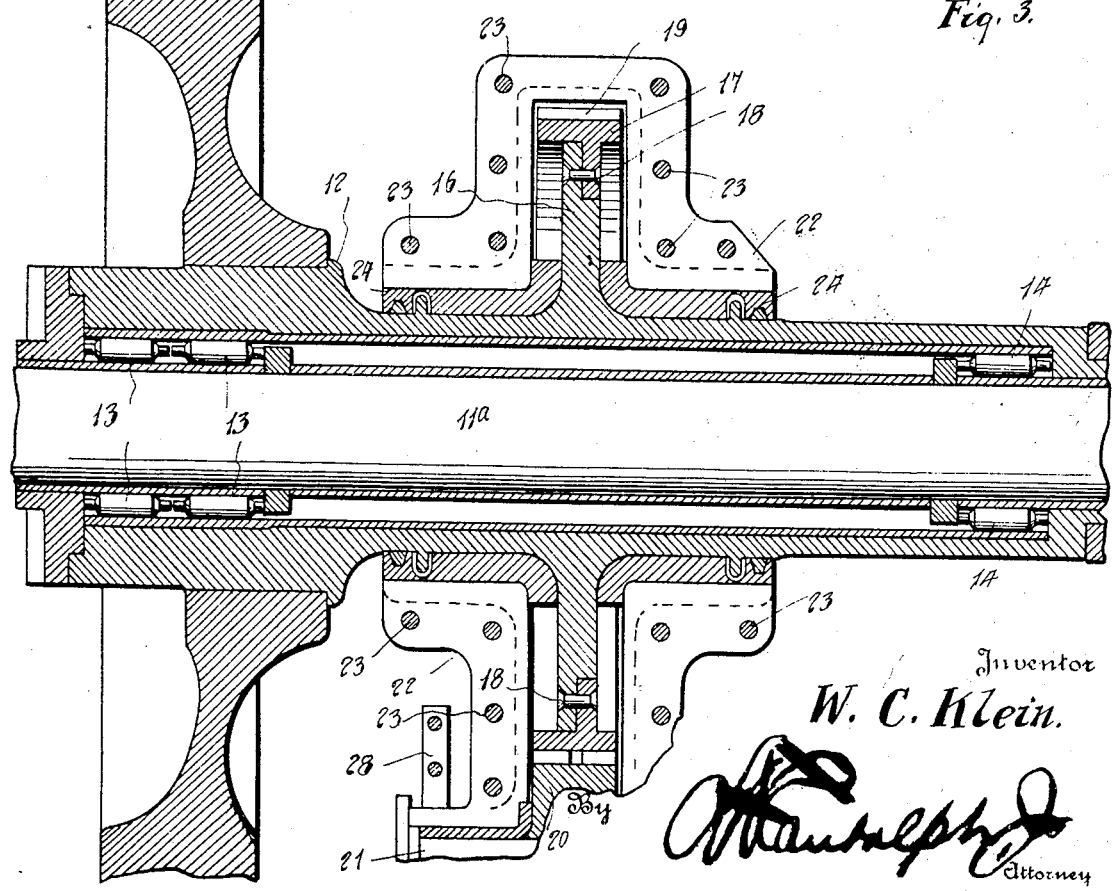

Figure 1 is a view partly in plan and partly in section, showing half of a truck frame embodying my invention, Figure 2 is a cross sectional view taken on the line 2—2 of Figure 1, and Figure 3 is an enlarged longitudinal sectional view particularly showing one of the gear cases and adjacent structure.

Referring specifically to the drawings, 10 designates a truck frame, only half thereof being shown, the said truck frame rigidly mounting an axle 11ª transversely thereof about which, rail engaging wheels 11, rotate free or independently of each other, each wheel 11 being carried by an axle sleeve 12, each rigidly carrying a wheel, and having anti-friction bearing engagement at 13 and 14 with the shaft 11ª, the sleeves or housings 12 having interfitting engagement with each other at 15, whereby one is free of the other or has a differential movement. The construction described is substantially that disclosed in my pending application previously referred to and may also be based on the construction of the aforesaid patent.

Extending radially from each housing 12 is an integral annular flange or lip 16 which has a rim 17 riveted thereto as at 18 and which rim is provided with spur gear teeth at 19. Such spur gear teeth mesh with the teeth of a pinion 20 which is keyed to a stub shaft 21. The said lip 16, rims 17 and pinion 20 are enclosed in housings 22, made up in sections detachably connected together by bolts as at 23. Such housings intimately engage portions of the shaft housings 12, being held in proper position by the interfitting of annular ribs 24 thereon in grooves of the sections of the casing 22. The sections of the casing are secured together with suitable gaskets and packing about the various parts so that the same contain a bath of oil in which the gearing operates. The shaft 21 is journaled in bosses 25 provided by the gear cases 22.

Suitably mounted or suspended on the frame 10, are a plurality of electric motors 26 arranged substantially in line with the shaft 21 and coupled thereto by suitable coupling devices 27, which may be partly universal in type, to permit slight relative movement of the gear cases and motor which may occur at times.

Said bosses 25 are journaled in brackets or bearings 28 rigidly supported on adjacent parts of the frame 10. As a result, the housings or casings 22 substantially "float" inasmuch as they are held in place solely by said brackets 28 and a structure which such housings surround. This is a decided advantage, since the casings or housings 22 in use may swing from the axis of the bosses 25, to automatically accord with changes in position vertically of the truck frame or wheels.

It will thus be seen that each of the free wheels is independently driven by means of the invention and that the results heretofore mentioned are attained.

I claim as my invention:—

1. A device of the class described having a fixed axle, a pair of wheels mounted for rotation on said axle, housings carrying said wheels and arranged for coaxial differential movement, a motor, gearing to drive one of said housings from said motor, a second motor, and means to drive the other housing from the second motor.

2. A device of the class described having a fixed axle, a pair of wheels mounted for rotation on said axle, housings carrying said wheels and arranged for coaxial differential movement, a motor, gearing to drive one of said housings from said motor, a second motor, means to drive the other housing from the second motor, and gear cases about the gearing and portions of said housings.

3. A device of the class described having a pair of wheels, housings carrying said wheels and arranged for coaxial differential movement, a motor, gearing to drive one of said housings from said motor, a second motor, means to drive the other housing from the second motor, gear cases about the gearing and portions of said housings, said gearing including lips integral with the housings and gear rims secured to said lips and located within the cases.

4. A device of the class described having a pair of wheels, housings carrying said wheels and arranged for coaxial differential movement, a motor, gearing to drive one of said housings from said motor, a second motor, means to drive the other housing from the second motor, gear cases about the gearing and portions of said housings, said gearing including lips integral with the housings and gear rims secured to said lips and located within the cases, pinions in mesh with said rims, stub shafts carrying said pinions, bosses on the gear cases mounting the stub shaft, and couplings between the motors and said stub shaft.

5. A device of the class described having a pair of wheels, housings carrying said wheels and arranged for coaxial differential movement, a motor, gearing to drive one of said housings from said motor, a second motor, means to drive the other housing from the second motor, and housings about said gearing and means, the last mentioned housings being arranged for movement from the axes of said motors, respectively.

6. A device of the class described comprising a frame, a pair of wheels, housings supported on said frame and carrying said wheels, said housings being arranged for coaxial differential movement, a motor, gearing to drive one of said housings from said motor, a second motor, gearing to drive the other housing from the second motor, housings about said gearing adapted to move with said first mentioned housings, and means mounting the second mentioned housings for pivotal movement substantially from the axes of said motors, respectively.

7. A device of the class described having a pair of wheels, housings carrying said wheels and arranged for coaxial differential movement, a motor, gearing to drive one of said housings from said motor, a second motor, means to drive the other housing from the second motor, gear cases about the gearing and portions of said housings, said gear cases being supported by said housings and adapted to move therewith, and means journaling said gear cases for movement substantially from the axes of said motors, respectively.

In testimony whereof I affix my signature.

WILLIAM C. KLEIN.